United States Patent
Coutre et al.

(10) Patent No.: US 12,282,455 B2
(45) Date of Patent: Apr. 22, 2025

(54) SYSTEMS AND METHODS FOR KEY MATCHING USING AMBIGUOUS DATA

(71) Applicant: JPMORGAN CHASE BANK, N.A., New York, NY (US)

(72) Inventors: Jack Coutre, Wheaton, IL (US); Corey Yates, Chicago, IL (US); Chandrasekharan N. Mana, Hoffman Estates, IL (US); Chandra Goyal, Aurora, IL (US); Annika Amlie, Chicago, IL (US); Pat Fortunato, Chicago, IL (US); Sadra Amiri Moghadam, Mission San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/320,335

(22) Filed: May 19, 2023

(65) Prior Publication Data

US 2024/0385990 A1 Nov. 21, 2024

(51) Int. Cl.
*G06F 16/14* (2019.01)
*G06F 16/11* (2019.01)

(52) U.S. Cl.
CPC .......... *G06F 16/148* (2019.01); *G06F 16/116* (2019.01)

(58) Field of Classification Search
CPC .. G06F 16/951; G06F 16/9535; G06F 16/583; G06F 16/258; G06F 16/288; G06F 40/205; G06F 16/93; G06F 16/25; G06F 16/2365; G06Q 30/0201
See application file for complete search history.

(56) References Cited

U.S. PATENT DOCUMENTS

| 2009/0204569 A1* | 8/2009 | Bowden | G06F 16/951 706/56 |
| 2022/0084091 A1* | 3/2022 | Doherty | G06F 16/285 |

* cited by examiner

*Primary Examiner* — Hau H Hoang
(74) *Attorney, Agent, or Firm* — GREENBERG TRAURIG LLP

(57) ABSTRACT

In some aspects, the techniques described herein relate to a method including: receiving ambiguous data at an interface of a matching platform; persisting the ambiguous data to a receiving data store of a matching platform; providing the ambiguous data as input to a matching engine; matching, by the matching engine, the ambiguous data to data in a production data store; retrieving, by the matching engine, a source identifier associated with the data in the production data store; and providing the source identifier to a user device in operative communication with the matching platform.

14 Claims, 3 Drawing Sheets

SYSTEMS AND METHODS FOR KEY MATCHING USING AMBIGUOUS DATA

BACKGROUND

1. Field of the Invention

Aspects generally relate to systems and methods for key matching using ambiguous data.

2. Description of the Related Art

Organizations may compile and store large amounts of structured data but may not have an efficient process for determining a source (e.g., a source identifier) of ambiguous data from within a data store. For instance, a service organization may compile comprehensive firmographic data related to partner organizations with which the service organization has business relationships. Business process flows captured through service offerings provided by a service organization may provide insights into services or products provided by the service organization that partner organizations are not currently taking advantage of. Often, however, ambiguous data available from business processes fail to positively identify a business partner and do not provide an analyst with pertinent contextual data with respect to a partner organization. The ability to match a unique company identifier may allow a positive identification of a business partner and the retrieval of stored data related to a business partner. This, in turn, may provide an appropriate path for further business development. Conventional queries using ambiguous data, however, may be inefficient in terms of resource utilization (e.g., of both human and technological resources).

SUMMARY

In some aspects, the techniques described herein relate to a method including: receiving ambiguous data at an interface of a matching platform; persisting the ambiguous data to a receiving data store of a matching platform; providing the ambiguous data as input to a matching engine; matching, by the matching engine, the ambiguous data to data in a production data store; retrieving, by the matching engine, a source identifier associated with the data in the production data store; and providing the source identifier to a user device in operative communication with the matching platform.

In some aspects, the techniques described herein relate to a method, wherein the ambiguous data is firmographic data.

In some aspects, the techniques described herein relate to a method, wherein the ambiguous data is received from a business store.

In some aspects, the techniques described herein relate to a method, wherein the received data is received via an event streaming platform.

In some aspects, the techniques described herein relate to a method, wherein the received data is received via a user interface.

In some aspects, the techniques described herein relate to a method, wherein the received data is uploaded in a file format.

In some aspects, the techniques described herein relate to a method, wherein the matching engine includes a machine learning model.

In some aspects, the techniques described herein relate to a system including at least one computer including a processor, wherein the at least one computer is configured to: receive ambiguous data at an interface of a matching platform; persist the ambiguous data to a receiving data store of a matching platform; provide the ambiguous data as input to a matching engine; match, by the matching engine, the ambiguous data to data in a production data store; retrieve, by the matching engine, a source identifier associated with the data in the production data store; and provide the source identifier to a user device in operative communication with the matching platform.

In some aspects, the techniques described herein relate to a system, wherein the ambiguous data is firmographic data.

In some aspects, the techniques described herein relate to a system, wherein the ambiguous data is received from a business store.

In some aspects, the techniques described herein relate to a system, wherein the received data is received via an event streaming platform.

In some aspects, the techniques described herein relate to a system, wherein the received data is received via a user interface.

In some aspects, the techniques described herein relate to a system, wherein the received data is uploaded in a file format.

In some aspects, the techniques described herein relate to a system, wherein the matching engine includes a machine learning model.

In some aspects, the techniques described herein relate to a non-transitory computer readable storage medium, including instructions stored thereon, which instructions, when read and executed by one or more computer processors, cause the one or more computer processors to perform steps including: receiving ambiguous data at an interface of a matching platform; persisting the ambiguous data to a receiving data store of a matching platform; providing the ambiguous data as input to a matching engine; matching, by the matching engine, the ambiguous data to data in a production data store; retrieving, by the matching engine, a source identifier associated with the data in the production data store; and providing the source identifier to a user device in operative communication with the matching platform.

In some aspects, the techniques described herein relate to a non-transitory computer readable storage medium, wherein the ambiguous data is firmographic data.

In some aspects, the techniques described herein relate to a non-transitory computer readable storage medium, wherein the ambiguous data is received from a business store.

In some aspects, the techniques described herein relate to a non-transitory computer readable storage medium, wherein the received data is received via an event streaming platform.

In some aspects, the techniques described herein relate to a non-transitory computer readable storage medium, wherein the received data is received via a user interface.

In some aspects, the techniques described herein relate to a non-transitory computer readable storage medium, wherein the received data is uploaded in a file format.

DETAILED DESCRIPTION

Figure 1:
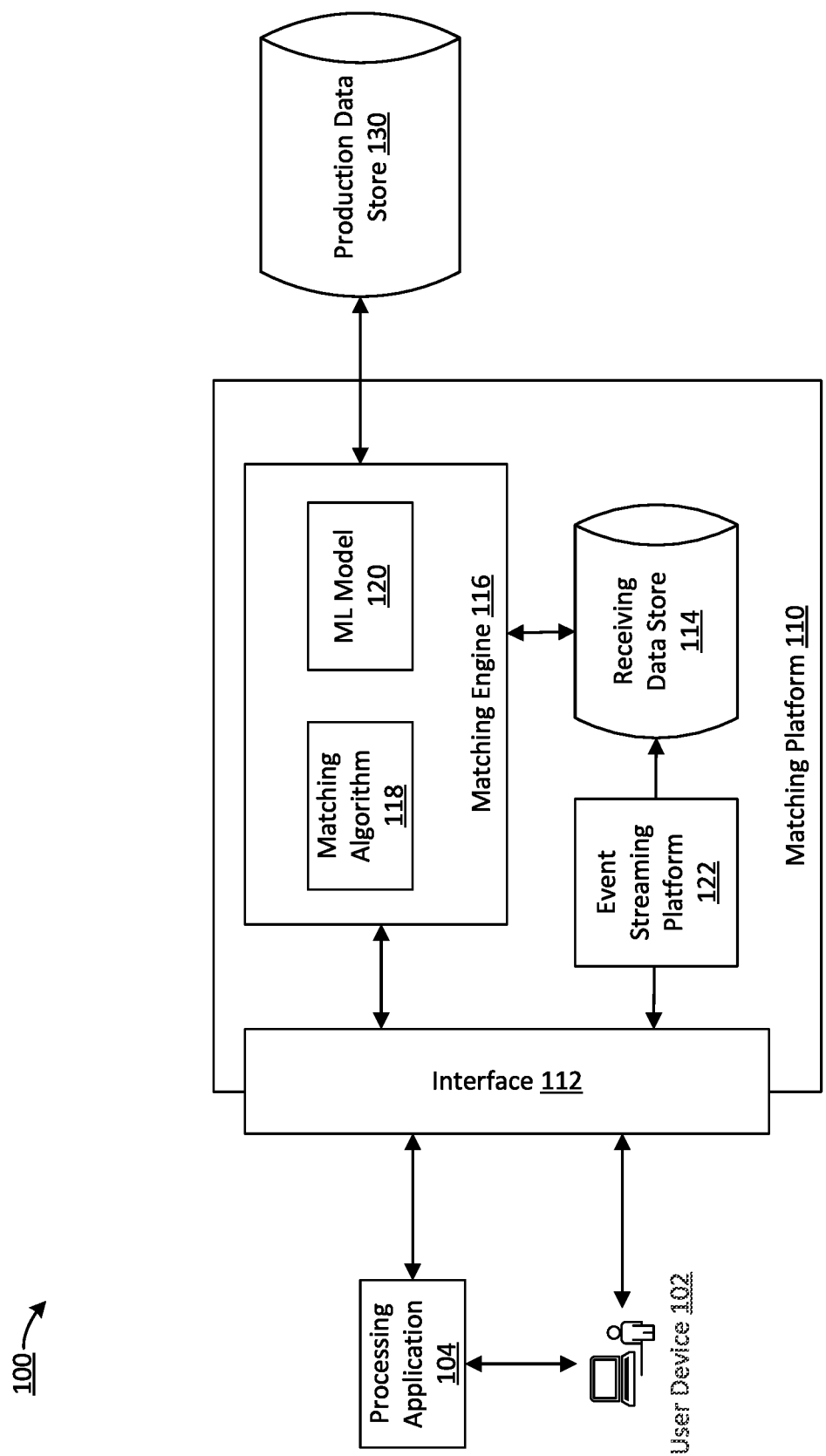
FIG. 1 is a block diagram of a system for key matching using ambiguous data, in accordance with aspects.

Aspects generally relate to systems and methods for key matching using ambiguous data.

In accordance with aspects, ambiguous data may be used as input to a matching engine, and the matching engine may output a source identifier that may be used for further processing, analysis or queries. In an exemplary use case, a source identifier may be used by a service organization to positively identify a partner organization. For instance, a source identifier may be a unique identifier that is associated with a partner organization and may be used as a lookup key to query a production data store for data/objects related to the partner organization. A service organization may be any business organization or institution. A service organization, e.g., may be a provider of services and/or goods and may maintain business relationships with various partner organizations. Partner organizations may be customers of the service organization, may be goods or service providers for the service organization, or may be any organization that a service organization maintains a business relationship with. While aspects are described herein in the context of a production data store provided by an organization for storing and retrieving data related to the providing organization's partner organizations, such context is for clarity and is exemplary only. The techniques described herein may be applied in various other contexts, and any clarifying examples should not be construed as limiting.

In accordance with aspects, a service organization may maintain a production data store that persists firmographic information about the service organization's various partner organizations. Such a data store may be used by the service organization's personnel to identify, research, analyze, contact, etc., partner organizations that are affiliated with the service organization. A data store may store firmographic data related to hundreds, thousands, or even millions of a service organization's partner organizations.

In accordance with aspects, a service organization may provide various business processes where the service organization utilizes raw data of a partner organization as data within the business process. For instance, a financial services organization may provide payment services to merchants or other customers of the service organization (i.e., partner organizations). A payment process may include payment data that is related to one or more of the service organization's partner organizations. The payment data (e.g., a phone number, address, business entity name, tax identifier, etc.) may be consistently used in the service organization's payment service and, accordingly may be readily identifiable in pattern recognition processes, but the data may be ambiguous in that it offers no, very little, or an incomplete, indication of the identity of the partner organization that owns, provides, and/or is related to the payment information.

A service organization may analyze its various business/service processes (e.g., using machine learning, pattern recognition, etc.) to discover areas of service or products that a service organization offers and that partner organizations are not currently taking advantage of. While analytical processing can recognize patterns using ambiguous data (i.e., recognizing where and when ambiguous data is present), a service organization's personnel must be able to positively identify a source of the ambiguous data (e.g., am associated partner organization) in order to use analytics for furthering business relationships. In large service organizations, however, it can be difficult to gain a comprehensive understanding of a partner organization's firmographic information with only ambiguous, or relatively ambiguous data. Accordingly, ambiguous data is ambiguous in the sense that it is part of a larger data set, where access to the larger data set would disambiguate the ambiguous data by providing a positive identification of the source of the ambiguous data and associated data that provides additional context for the ambiguous data. For instance, understanding a unique company identifier (i.e., a source identifier) may allow the querying of a firm-wide company business repository (i.e., a production data store) in order to return all or some relevant part of a partner organization's firmographic information, which in turn may provide an appropriate path for further business development.

In accordance with aspects, a service organization may provide an interface that facilitates receiving ambiguous data as input. Input data may include ambiguous or incomplete firmographic data that describes or categorizes an organization based on its characteristics. Organizational characteristics may include information such as location, industry, market, performance, structure, etc. More specific firmographic data may include an organization's name, address, phone number, website address (e.g., in the form of a URL), etc. Organizations, such as partner organizations, may publish firmographic data and make it available via various sources for public consumption. A service organization may maintain systems and processes for harvesting partner organizations' published firmographic data and persisting it in, e.g., a production data store for use by the service organization's personal and processing systems.

In accordance with aspects, an interface may be graphical such as a web form, or programmatic such as an application programming interface (API). In the case of a graphical format, an interface may include a web form with which a user can interact. A graphical interface may include fields where a user can enter data (such as ambiguous data) directly into the form. In other aspects, a graphical interface may include a path indicator where a user can specify a location of a file for upload. For instance, a user may specify at a graphical user interface a uniform resource locator (URL) address, or some other resource locator string that indicates the location of a file, and the interface may retrieve the file for further processing. A retrieved file may be in any suitable format, such as CSV, JSON, XML, etc. A retrieved file may be programmatically formatted by, e.g., a pattern recognition or other analytical computer program or process and may contain ambiguous data that may be related to a plurality of partner organizations.

In other aspects, an interface may be an API. An API may receive ambiguous data as parameterized data that is included in an API method call as an argument of the called method. APIs may publish various methods and expose the methods via API gateways. A published API method may be called by an application that is authorized to access the published API methods. API methods may take data as one or more parameters of the called method. API access may be governed by an API gateway associated with a corresponding API. Incoming API method calls may be routed to an API gateway and the API gateway may forward the method calls to internal API servers that may execute the called method, perform processing on any data received as parameters of the called method, and send a return communication to the method caller via the API gateway. A return communication may also include data based on the called method and its data parameters.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

In still other aspects, an API may be a producer API that collects streaming ambiguous data to a topic published by an event streaming platform. A distributed event streaming platform (e.g., the Apache Kafka® platform) and a corresponding API handle associated events in the form of real time and near-real time streaming data to/from streaming data pipelines and/or streaming applications. Streaming data may be continuously generated by a data source.

An event streaming platform can receive streaming data from multiple sources and process the data sequentially and incrementally. Event streaming platforms can be used in conjunction with real time and near-real time streaming data pipelines and streaming applications. For example, an event streaming platform can ingest and store streaming data from the data pipeline and provide the data to an application that process the streaming data. An event platform may include some partitioned commit logs (each, an ordered sequence of records) to store corresponding streams of records. The logs are divided into partitions, and a subscriber can subscribe to a "topic" that is associated with a partition, and thereby receive all records stored at the partition (e.g., as passed to the subscriber in real time by the platform). An event streaming platform may expose a producer API that publishes a stream of records to a topic, and a consumer API that a consumer application can use to subscribe to topics and thereby receive the record stream associated with that topic. An event streaming platform may also publish other APIs with necessary or desired functionality.

In accordance with aspects, an event streaming platform may provide a topic for a particular user and as messages from the topic queue are matched, the matches may be transmitted back to the user via a specific topic (e.g., payment data). Other API interfaces, such as custom API interfaces may be configured to receive data programmatically from various organizational programs via API method calls including data parameterized as one or more API method arguments.

In accordance with aspects, an interface may receive or retrieve ambiguous firmographic data and may transmit the data for storage as one or more objects in a receiving data store. A data object refers to data in its native format. A native format is the format data is received in from a source application or system. In some aspects, a receiving data store may be a key-value store. A key value store is a data store with a set of associated values and a group of key identifiers. In a key-value store, there are two related data elements. The first element is a constant that is used to define a corresponding data set, and the second element is a value that is a variable of the corresponding data set. A key-value store is a form of an array where no keys are repeated (i.e., each key value is unique).

Key-value stores provide low latency storage and retrieval compared to other data stores and are more flexible due to the ability to accommodate different types of data and different dimensions as opposed to, e.g., relatively rigid tables of a relational database. Key-value pairs enable faster read and write operations since they do not require placeholders for optional, default, or missing keys or values. Key-value pairs also facilitate retrieval of very specific data, since only data associated with a particular key will be retrieved based on a reference to the particular key.

In some aspects, a receiving data store may be configured as a data lake. A data lake is a data store that can rapidly ingest large amounts of raw data (i.e., data that has not been processed or prepared for any particular use) in its native format. Data lakes may store structured data, semi-structured data, and unstructured data. In an exemplary aspect, ambiguous firmographic data may be stored as a data object in a data store. In some aspects, data may be received at a data lake in a format having embedded schema information, such as a key-value pair schema. Accordingly, ambiguous firmographic data may be received at a data store, such as a data lake, in a file format that embeds schema information. Embedded schema information may identify and/or define a schema such as a key-value pair. Thus, data may be stored in a data lake in its native format, and its native format may be a flat-file format that defines a key-value pair schema within the data file.

Data objects received at a receiving data store may be processed to generate a data structure that may be used as input to a matching engine. For instance, a data object that includes various values of firmographic data may be parsed to delineate each value as a component value. In some aspects, data may be transformed into a parquet format and aligned, or normalized with, data types within an relevant input schema. A value may be used as input to a matching algorithm that may search a production data store (e.g., of partner organizations) for a match with respect to the input value. A production data store may be any suitable data store. In an exemplary aspect, a production data store may persist published firmographic data for a partner organization with an association to a source identifier. An exemplary production data store may take the form of a graph database including nodes and edges that form the graph structure. Other aspects may use other storage formats such as a relational database, a NoSQL database, etc.

In accordance with aspects, a matching algorithm may output a source identifier of a partner organization associated with a partner organization that has firmographic data that matches the ambiguous firmographic data that was input to the algorithm. Aspects may normalize firmographic data using cleaning functions for data such as company names, URLs, phone numbers, addresses, tax IDs, etc., for stronger comparisons. Aspects may utilize minhash and/or vector multiplication to create similarity scores for firmographic fields. Match overrides from user provided data (which may be received in a file or other bulk format) may be enforced to force matches that are known from outside information, as well as force records not to match to specific partner organization source records. An input record may match to many partner organizations. In such case, a user may be provided functionality (i.e., via an interface to the platform) to choose which partner organizations the user wishes to match input against. Alternatively, a user may wish to maintain matches to all sources retrieved from the production data store.

A source identifier may be a unique identifier that is associated with a partner organization. A source identifier may be an arbitrary identifier that is randomly generated or may take a particular non-arbitrary format. In some aspects, the source identifier may be used as a lookup key for retrieving some or all persisted and associated data (e.g., firmographic data that is stored for a partner organization).

In accordance with aspects, a machine learning (ML) model, which may be part of a matching algorithm or process, may apply various rules to a matching algorithm's output to determine matches versus non-matches based on similarity. Rules may include combinations of various thresholds for identifying similarities of the firmographic elements. For instance, an exemplary mathcing rule may have the following parameters indicating a confidence level that must be met given the respective data fields: name_score>0.99 and zipMatch>0.99 and address_score>0.99. Some rules may incorporate domain knowledge surrounding data elements. For example, legal entity identifiers (LEIs) within a country may only be used for a single company, accordingly a rule may follow the following format: LEI_Match>0.99 and countryMatch>0.99. Using both a country and LEI combination rule may virtually guarantee a match. In some aspects, an indicator may be included as an data element where a record is missing a number (e.g., a majority) of firmographic elements used for matching. This may be referred to as a "thin" record. A thin record indicator may be used to focus a match rule on a particular firmographic element that does exist within the record. For instance, the following exemplary rule focuses on URL matches in the same country if other firmographic elements are not available: URL_score>0.99 and thinFileCountryCondition>0.99 and thinfileindicator>0.99. Aspects may further allow for user creation, configuration, weighting, etc., of customized rules, or similar adjustments to default or existing rules. In some aspects, a ML model may perform cleansing operations to normalize fields and rules that select which potential matches are output to a user.

In accordance with aspects, a matching engine may output files that include groupings of source records as a single unified group with a single source identifier. An output file that is generated by a matching engine may be presented to a user via any acceptable medium. For instance, an output file may be transmitted as an email attachment, may be made available through a programmatic interface, may be placed in a storage repository, a network directory, or some other logical storage container that is dedicated to one or more users, etc.

In some aspects, data being transmitted to a receiving data store may trigger a notification that begins processing of the receive data by a matching engine using the received data as input to the matching engine. Rules with respect to a matching engine are set in a predetermined order (e.g., descending). Each rule, if the included criteria is met, is considered a match. In some aspects, a highest rule is checked first and a matching algorithm proceeds in descending order. Any rule whose criteria is met is indicated as a match. Matches are logged and a number of matches may be used as a threshold to determine a matching score. E.g., if input data matches on 3 criteria, a matching score may be higher (more confidence) than if it only matches on 2 criteria (e.g., a match on a name, address, and phone number as opposed to a match just on a name and address). In accordance with some aspects, only one source identifier and/or output file is returned to a user. In some aspects, if ambiguous data returns more than one match, a top n number of matches may be returned based on a confidence score. For instance, a ML model may predict a confidence score for each match and all matches with a confidence score greater than a threshold score may be returned to a use.

Aspects may include the addition of new rules and the re-ordering of rules by a user. That is, a user may be able to add new rules and re-order rules. Rules and their orders may be saved by a platform for particular users that access the platform, or may be saved for larger user groups or per user devices, etc. Rules may be added and/or edited via an interface, e.g., a graphical user interface, that is accessible by a user.

FIG. 1 is a block diagram of a system for key matching using ambiguous data, in accordance with aspects. System 100 includes matching platform 110. Matching platform 110 includes interface 112, event streaming platform 122, receiving data store 114, and matching engine 116. Matching engine 116 includes matching algorithm 118, and machine learning (ML) model 120. System 100 further includes processing application 104, user device 102, and production data store 130.

In accordance with aspects, user device 102 may be a user electronic device such as a computer workstation, laptop, or other electronic processing device in operative communication with, e.g., processing application 104 and/or event streaming platform 122. User device 102 may be configured to interact with processing application 104 and with interface 112. For instance, user device 102 may include a client application that allows a user of user device 102 to interact with processing application 104. Processing application 104 is a production business application provided by a service organization. Processing application 104 may use ambiguous data in its processing operations. In an exemplary aspect, processing application 104 may be a payment processing application or system and may use ambiguous firmographic data in executed payment processes.

In accordance with aspects, a user of user device 102 may be aware of ambiguous data used by processing application 104 (e.g., through analysis, pattern recognition, etc.) and may wish to retrieve a source identifier of the ambiguous data. In other aspects, processing application 104 or another application (not shown) in operative communication with processing application 104 may determine ambiguous data used in-process in processing application 104. The ambiguous data may be submitted to matching platform 110 via receiving data store 114.

Interface 112 may be any suitable interface for receiving ambiguous data from user device 102, processing application 104 or another application. For instance, interface 112 may be a graphical user interface, an API, an event streaming platform API, etc. Interface 112 may be configured to receive ambiguous data from user device 102 or processing application 104 in any suitable format. For instance, interface 112 may receive raw ambiguous data from user device 102 via a web-based form or may receive a particular file format from interface 112 via, e.g., a path indicator where a user can specify a location of a file for upload. In other aspects, interface 112 may be a programmatic interface such as an API that can interface directly with processing application 104 or another intermediate application for recognizing and transmitting ambiguous data.

In accordance with aspects, ambiguous data received via interface 112 may be sent to and stored in receiving data store 114. Receiving data store 114 may be any suitable data store for storing ambiguous data. In some aspects, receiving data store 114 may be a key-value store; in other aspects, receiving data store 114 may be a data lake, etc. Receiving data store 114 may be configured to store ambiguous data as data objects. Ambiguous data may be received as files of a particular format, such as CSV, JSON, XML, etc.

In some aspects, receiving data store 114 may receive ambiguous data from event streaming platform 122. That is, event streaming platform 122 may be an event streaming platform that provides a producer API. In some aspects, interface 112 may be a producer API of event streaming platform 122. Processing application 104 or another application may publish ambiguous data to the producer API of event streaming platform 122. Event streaming platform 122 may also provide a consumer API and may stream received ambiguous data to the consumer API. Receiving data store 114 may subscribe to the consumer API and ingest ambiguous data as it is streamed to receiving data store 114.

In accordance with aspects, ambiguous data received at receiving data store 114 may be re-formatted by matching engine 116 into a format that matching algorithm 118 and/or ML model 120 can accept and process as input data. Matching engine 116 may receive data objects from receiving data store 114 format the data objects into an acceptable format and process them with matching algorithm 118 and ML model 120. Matching algorithm 118 may take an ambiguous data value as input and may search production data store 130 for a match with respect to the input value. Upon finding a match to the input data, matching algorithm 118 may retrieve a source identifier associated with the matched data and may output the source identifier. ML model 120 may apply various rules to a matching algorithm's output to determine matches versus non-matches based on similarity.

In accordance with aspects, matching engine 116 may output files that include groupings of source records as a single unified group with a single source identifier. Matching engine 116 may output the files to interface 112, which may provide the output to user device 102. In other aspects, matching engine 116 may transmit the output to user device 102 as an email via an email server or may provide the output in another suitable way as discussed in more detail herein.

Figure 2:
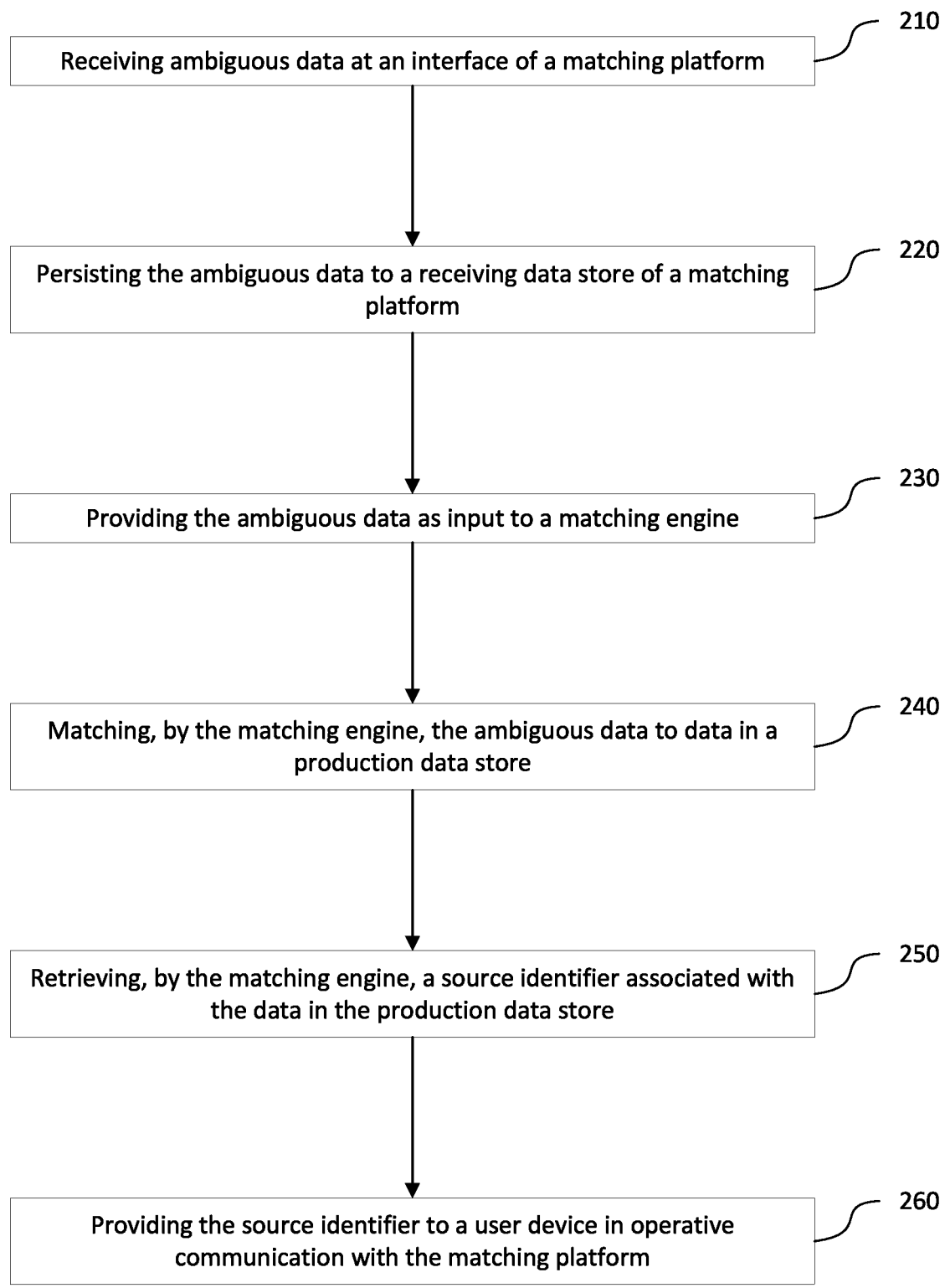
FIG. 2 is a logical flow for key matching using ambiguous data, in accordance with aspects.

FIG. 2 is a logical flow for key matching using ambiguous data, in accordance with aspects.

Step 210 includes receiving ambiguous data at an interface of a matching platform.

Step 220 includes persisting the ambiguous data to a receiving data store of a matching platform.

Step 230 includes providing the ambiguous data as input to a matching engine.

Step 240 includes matching, by the matching engine, the ambiguous data to data in a production data store.

Step 250 includes retrieving, by the matching engine, a source identifier associated with the data in the production data store.

Step 260 includes providing the source identifier to a user device in operative communication with the matching platform.

Figure 3:
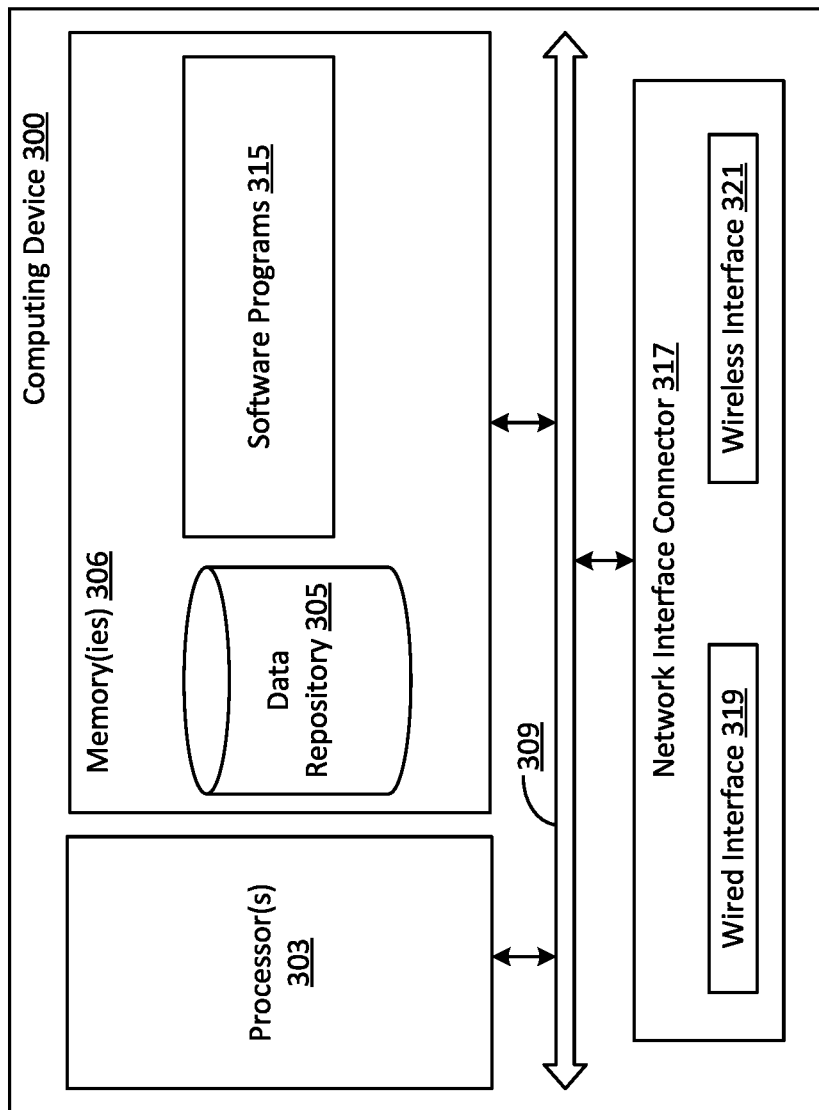
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a user device, an interface, an event streaming platform, a matching algorithm, and various database/data store engines and servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
    receiving ambiguous data at an interface of a matching platform;
    persisting the ambiguous data to a receiving data store of the matching platform;
    providing the ambiguous data in a native file format having embedded schema information which defines a key-value pair schema within the ambiguous data as input to a matching engine;
    matching, by the matching engine, the ambiguous data to data in a production data store using the key-value pair schema;
    retrieving, by the matching engine, a source identifier associated with the data in the production data store; and
    providing the source identifier to a user device in operative communication with the matching platform.

2. The method of claim 1, wherein the ambiguous data is firmographic data.

3. The method of claim 1, wherein the ambiguous data is received from a business store.

4. The method of claim 1, wherein the ambiguous data is received via an event streaming platform.

5. The method of claim 1, wherein the matching engine includes a machine learning model.

6. A system comprising one or more processors and one or more storage devices storing instructions that when executed by one or more processes, cause the processor to:
    receive ambiguous data at an interface of a matching platform;
    persist the ambiguous data to a receiving data store of the matching platform;
    provide the ambiguous data in a native file format that embeds schema information which is defined by a key-value pair schema within the data as input to a matching engine;
    match, by the matching engine, the ambiguous data to data in a production data store using the key-value pair schema;
    retrieve, by the matching engine, a source identifier associated with the data in the production data store; and
    provide the source identifier to a user device in operative communication with the matching platform.

7. The system of claim 6, wherein the ambiguous data is firmographic data.

8. The system of claim 6, wherein the ambiguous data is received from a business store.

9. The system of claim 6, wherein the ambiguous data is received via an event streaming platform.

10. The system of claim 6, wherein the matching engine includes a machine learning model.

11. A non-transitory computer readable storage medium, including instructions stored thereon, which instructions, when read and executed by one or more computer processors, cause the one or more computer processors to perform steps comprising:
    receiving ambiguous data at an interface of a matching platform;
    persisting the ambiguous data to a receiving data store which is associated with a set of values of the matching platform and a group of key identifiers of the matching platform;
    providing the ambiguous data in a native file format that embeds schema information which is defined by a key-value pair schema within the data as input to a matching engine;
    matching, by the matching engine, the ambiguous data to data in a production data store using the key-value pair schema;
    retrieving, by the matching engine, a source identifier associated with the data in the production data store; and
    providing the source identifier to a user device in operative communication with the matching platform.

12. The non-transitory computer readable storage medium of claim 11, wherein the ambiguous data is firmographic data.

13. The non-transitory computer readable storage medium of claim 11, wherein the ambiguous data is received from a business store.

14. The non-transitory computer readable storage medium of claim 11, wherein the ambiguous data is received via an event streaming platform.

* * * * *